Aug. 11, 1931.                C. D. THOMPSON                1,818,658
                       JUVENILE VEHICLE ACCESSORY
                          Filed Sept. 25, 1930

INVENTOR
Charles D. Thompson
BY
Whittemore, Hulbert, Whittemore & Belknap
ATTORNEYS Patented Aug. 11, 1931

1,818,658

UNITED STATES PATENT OFFICE

CHARLES D. THOMPSON, OF WALKERVILLE, ONTARIO, CANADA

JUVENILE VEHICLE ACCESSORY

Application filed September 25, 1930. Serial No. 484,393.

This invention relates generally to accessories for juvenile vehicles and refers more particularly to carriers adapted to be attached to children's tricycles and the like.

One of the essential objects of the invention is to provide a carrier that is simple in construction, neat in appearance and that is easy and inexpensive to manufacture.

Another object is to provide a carrier that may be readily attached to or detached from the tricycle by a child and that cannot become accidentally disengaged from the tricycle while in use after being attached.

Another object is to provide a strong and durable carrier that is capable of various uses such as a platform, a basket, or a seat that is capable of carrying relatively heavy loads.

Other objects, advantages and novel details of construction of this invention will be made more apparent as this description proceeds, especially when considered in connection with the accompanying drawings, wherein.

Figure 1:
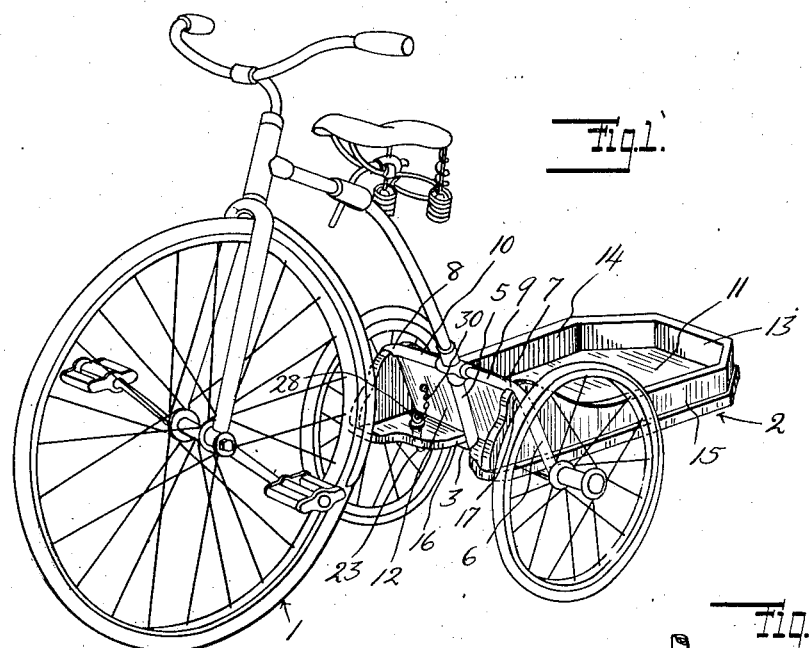
Figure 1 is a perspective view of a tricycle with an accessory embodying my invention applied thereto.
Figure 2:
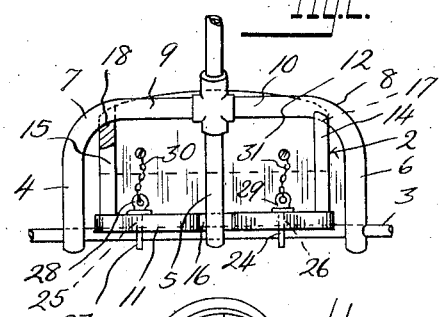
Figure 2 is a vertical sectional view through the tricycle and showing the forward end of the accessory.

Referring now to the drawing, 1 is a child's tricycle and 2 is a carrier attached to the tricycle and embodying my invention. As shown, the tricycle has a rear axle 3 and three laterally spaced arms 4, 5 and 6 respectively extending upwardly from said axle and constituting a part of the frame work of the vehicle. The outermost arms 4 and 6 are curved intermediate their ends as at 7 and 8 respectively and have substantially horizontal portions 9 and 10 respectively connected to the intermediate arm 5 at diametrically opposite sides thereof. Thus these arms form in effect a three prong fork and serve to brace and reinforce the structure.

In the present instance the carrier 2 is constructed of wood and has a flat platform portion 11, and the front, back and side wall portions 12, 13, 14 and 15 respectively. As shown, the platform portion 11 is cut away at its forward end and is provided at approximately the center of this cut away portion with a rearwardly extending elongated slot 16. The front wall portion 12 rises from the platform 11 immediately in rear of this slot and preferably inclines forwardly. The side wall portions 14 and 15 are identical in construction and extend upwardly from the platform 11 adjacent the longitudinal edges thereof and are secured to and project in advance of the upright side edges of the front wall 12. Preferably the upper edges of these side walls are provided just in advance of the front wall 12 with aligned upwardly opening transversely extending notches 17 and 18 respectively and curve downwardly in advance of said notches and in rear of the front wall 12. As shown, the distance between the side walls 14 and 15 and the depth of said side walls at the notches 17 and 18 are such that the notches 17 and 18 will receive the curved portions 7 and 8 of the arms 4 and 6 when the platform 11 rests on the axle 3. In fact, the distance between the lower edges of the notches 17 and 18 and the lower face of the platform 11 is only a very little less than the distance between the axle 3 and the horizontal portions 9 and 10 of the arms 4 and 6, and the distance between the upright portions of said arms 4 and 6 is only a little more than the distance between the outer faces of the side walls 14 and 15 of the carrier. Hence, when the platform 11 rests on the axle 3 the carrier cannot move vertically a sufficient distance to become disengaged from the tricycle for the lower edges of the notches 17 and 18 will engage the curved portions 7 and 8 of the arms 4 and 6 and will prevent such movement. Likewise the carrier cannot move longitudinally because of the engagement of the front and rear edges 20 and 21 respectively of the notches with the curved portions 7 and 8 of the arms. As a result the carrier cannot become accidentally disengaged from the tricycle while in use. Moreover, two pins 23 and 24 respectively may be used if desired as auxiliary latch means to retain the carrier on the axle 3. As shown, these pins extend through openings 25 and 26 respectively in the platform 11 and project downwardly in advance of the axle 3 of the tricycle. Preferably the upper ends of the pins are provided with eyes 28 and 29 respectively that receive chains 30 and 31 respectively connected to the front wall 12.

Thus from the foregoing description it will be readily apparent that I have provided an extremely simple but very practical accessory for juvenile vehicles. When it is desired to attach the carrier to the tricycle the rear end of the carrier is moved to one side while the carrier is in an upwardly and rearwardly inclined position so that the forward end of one side wall of the carrier may be inserted between the axle 3 and one of the horizontal portions 9 and 10 of the arms. The rear end of the carrier is then moved downwardly and into alignment with the vehicle and at the same time the forward end of the carrier is shifted to one side so that the notches 17 and 18 respectively in the side walls will receive the curved portions 7 and 8 of the arms. When in this position the platform 11 rests on the axle 3 and the carrier is ready for use. If desired the pins 23 and 24 may be inserted downwardly through the openings 25 and 26 in advance of the axle 3 to tie the carrier upon the tricycle. When attached the carrier may be used for many purposes, for instance, to carry parcels or passengers, and the connection between said carrier and the tricycle is such that this may be accomplished with utmost safety. When it is desired to detach the carrier the steps of attachment just mentioned are reversed.

Figures 3, 4, 5:
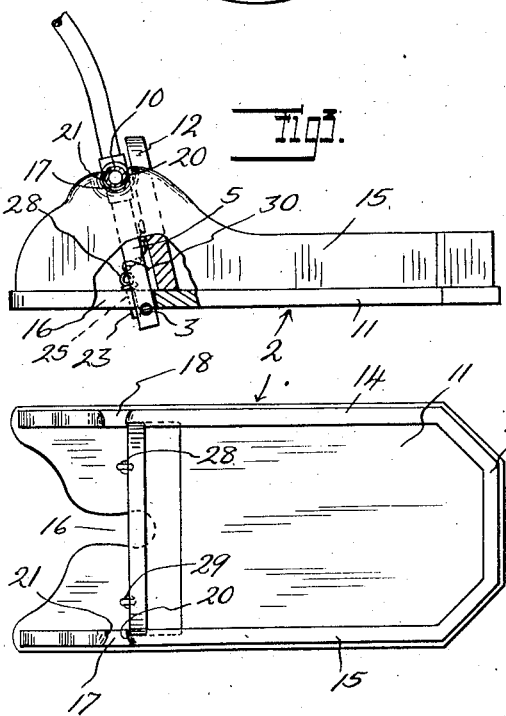
Figure 3 is a fragmentary side elevation of the tricycle with the accessory applied thereto.
Figure 4 is a top plan view of the accessory per se.
Figure 5 is a perspective view showing a slightly modified form of accessory.

In Figure 5 I have illustrated a slight modification in which the platform 40 has a stepped portion 41. Otherwise the construction is the same as that illustrated in Figures 1 to 4 inclusive. When assembled the platform 40 is below the axle 3 and the stepped portion 41 rests on said axle. Thus in this construction the center of gravity of the carrier is closer to the ground so that the stability of the carrier is improved.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. An accessory for juvenile vehicles comprising a platform having a portion adapted to rest upon an axle of the vehicle and having a slot in said portion for receiving another portion of the vehicle, and means on the platform for establishing a separable connection with the vehicle.

2. An accessory for juvenile vehicles comprising a platform having a portion adapted to rest upon an axle of the vehicle and side walls projecting from said platform and having means for receiving portions of the vehicle, and auxiliary means associated with the platform and engageable with the axle of the vehicle to retain the receiving means aforesaid in operative position relative to the vehicle.

3. In combination, a tricycle having a rear axle and arms extending upwardly from said axle and having inturned portions, and a carrier having a base resting on the axle and having means extending upwardly and detachably receiving the inturned portions of said arms.

4. In combination, a tricycle having a rear axle and arms extending upwardly from said axle and having inturned portions, and a carrier detachably secured between said axle and inturned portions of said arms.

5. In combination, a tricycle having a rear axle and arms extending upwardly from said axle and having inturned portions, and a carrier having a base resting on the axle and having side walls projecting upwardly from said base and provided with notches that receive the inturned portions of said arms.

6. An accessory for a tricycle comprising a platform adapted to rest upon an axle of the tricycle, and means carried by the platform for detachably maintaining the platform on the axle of the tricycle.

7. An accessory for a tricycle comprising a platform adapted to rest upon an axle of the tricycle, and spaced members rising from said platform and having means for interlocking engagement with frame portions of the tricycle while the platform is on the axle.

8. An accessory for a tricycle having a rear axle and arm portions rising from said axle, comprising a platform adapted to rest upon the axle of the tricycle, and spaced members rising from said platform and having notches for receiving the arm portions aforesaid while the platform is on the axle.

9. An accessory for a tricycle having a rear axle and arm portions rising from said axle, comprising a platform adapted to rest upon the axle of the tricycle, spaced wall members rising from said platform and having notches for receiving the arm portions aforesaid when the platform is on the axle, and means cooperating with the platform and engageable with the axle to prevent accidental removal of the portions aforesaid of the tricycle from the notches in said wall members.

10. An accessory for a tricycle having a rear axle and arm portions rising from the axle, comprising a platform having a portion adapted to rest upon the axle of the tricycle and side walls projecting from said platform and having aligned notches in their upper edges adapted to receive the arm portions aforesaid.

11. An accessory for tricycles having an axle and inverted L-shaped arms rising from the axle, including a platform adapted to rest on the axle of the tricycle, and side members rising from the platform and having notches in their upper edges for detachably receiving portions of the inverted L-shaped arms of the tricycle.

12. An accessory for tricycles having an axle and inverted L-shaped arms rising from the axle, including a platform adapted to rest on the axle of the tricycle, and means on the platform engageable with portions of the arms to maintain the platform on the axle.

13. An accessory for tricycles having an axle and inverted L-shaped arms rising from the axle, including a platform adapted to rest on the axle of the tricycle, side members rising from the platform and engageable with portions of said arms, a rear wall rising from the platform, and means associated with said rear wall and platform for holding the latter on the axle of the tricycle and for maintaining the engagement between said side members and arms.

In testimony whereof I affix my signature.

CHARLES D. THOMPSON.